United States Patent
Suzuki et al.

(10) Patent No.: US 8,995,828 B2
(45) Date of Patent: Mar. 31, 2015

(54) OPTICAL TRANSMISSION DEVICE, OPTICAL TRANSMISSION SYSTEM AND OPTICAL TRANSMISSION METHOD

(75) Inventors: Yuichi Suzuki, Kawasaki (JP); Toshihiro Ohtani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 762 days.

(21) Appl. No.: 13/281,127

(22) Filed: Oct. 25, 2011

(65) Prior Publication Data
US 2012/0121256 A1    May 17, 2012

(30) Foreign Application Priority Data

Nov. 12, 2010   (JP) ................................ 2010-254281

(51) Int. Cl.
| | |
|---|---|
| H04B 10/08 | (2006.01) |
| H04B 17/00 | (2006.01) |
| H04B 10/04 | (2006.01) |
| H04B 10/12 | (2006.01) |
| H04B 10/079 | (2013.01) |
| H04J 14/02 | (2006.01) |

(52) U.S. Cl.
CPC ...... *H04B 10/07957* (2013.01); *H04J 14/0221* (2013.01); *H04J 14/0275* (2013.01)
USPC ........ 398/25; 398/9; 398/22; 398/23; 398/24; 398/182; 398/192; 398/195; 398/196

(58) Field of Classification Search
None
See application file for complete search history.

(56) References Cited

U.S. PATENT DOCUMENTS

| | | | | |
|---|---|---|---|---|
| 5,271,075 | A * | 12/1993 | Gfeller et al. | ................... 385/20 |
| 7,139,120 | B2 | 11/2006 | Sugiya | |
| 2001/0026385 | A1* | 10/2001 | Cao | ............................... 359/124 |
| 2004/0218919 | A1* | 11/2004 | Hunsche et al. | ................ 398/27 |
| 2007/0229838 | A1* | 10/2007 | Greening et al. | ............. 356/460 |

FOREIGN PATENT DOCUMENTS

| | | |
|---|---|---|
| JP | 2004-158652 A | 6/2004 |
| JP | 2006-074098 A | 3/2006 |

* cited by examiner

*Primary Examiner* — Darren E Wolf
(74) *Attorney, Agent, or Firm* — Staas & Halsey LLP

(57) ABSTRACT

An optical transmission device includes an extractor that extracts respective optical signals from optical signals multiplexed from a plurality of optical signals of different wavelengths, a detector that detects wavelengths of the extracted respective optical signals, a storage that stores the wavelengths of the detected respective optical signals, and a processor that is operative to derive trends in wavelength variation of the respective optical signals based on the detected respective optical signals and the respective optical signals stored in the storage, and determines that either one or both of the extractor and the detector cause the wavelengths to be varied when the trends in wavelength variation of two or more wavelengths are the same.

11 Claims, 20 Drawing Sheets

FIG. 9

| WAVELENGTH SHIFT AMOUNT [nm] | VOLTAGE [mV] |
|---|---|
| 0.20 | 200 |
| 0.15 | 150 |
| 0.10 | 100 |
| 0.05 | 50 |
| 0 | 0 |
| -0.05 | -50 |
| -0.10 | -100 |
| -0.15 | -150 |
| -0.20 | -200 |

| WAVELENGTH SHIFT AMOUNT [nm] | ANGLE | VOLTAGE [mV] |
|---|---|---|
| 0.20 | 0.4 | 200 |
| 0.15 | 0.3 | 150 |
| 0.10 | 0.2 | 100 |
| 0.05 | 0.1 | 50 |
| 0 | 0 | 0 |
| -0.05 | -0.1 | -50 |
| -0.10 | -0.2 | -100 |
| -0.15 | -0.3 | -150 |
| -0.20 | -0.4 | -200 |

| WAVELENGTH SHIFT AMOUNT [nm] | TEMPERATURE [deg. C] | VOLTAGE [mV] |
|---|---|---|
| 0.20 | 2.0 | 200 |
| 0.15 | 1.5 | 150 |
| 0.10 | 1.0 | 100 |
| 0.05 | 0.5 | 50 |
| 0 | 0 | 0 |
| -0.05 | -0.5 | -50 |
| -0.10 | -1.0 | -100 |
| -0.15 | -1.5 | -150 |
| -0.20 | -2.0 | -200 |

OPTICAL TRANSMISSION DEVICE, OPTICAL TRANSMISSION SYSTEM AND OPTICAL TRANSMISSION METHOD

CROSS-REFERENCE TO RELATED APPLICATIONS

This application is based upon and claims the benefit of priority of the prior Japanese Patent Application No. 2010-254281, filed on Nov. 12, 2010, the entire contents of which are incorporated herein by reference.

FIELD

The present invention relates to an optical transmission device, an optical transmission system, and an optical transmission method.

BACKGROUND

Wavelength Division Multiplexing (WDM) is a technology used in the field of optical communications. Conventionally, an optical channel monitor (OCM) is used in a wavelength division multiplexing system. The optical channel monitor is used to monitor the wavelength and optical power of signals in channels for wavelength multiplexed signals. For example, a wavelength control device such as a wavelength selectable switch (WSS) controls each channel based on monitor information from the optical channel monitor. Furthermore, monitor information from the optical channel monitor may also be used for generating an alarm when the wavelength shifts. Therefore, the optical channel monitor is expected to provide very precise monitoring. The precision for wavelength monitoring is expected to be in the range of ±0.05 nm or less. Moreover, there is a system in which an optical channel monitor detects a shift in wavelengths of about ±0.1 nm and then sounds an alarm.

In the related art there is a wavelength multiplexing optical transmitter that uses an arrayed waveguide grating (AWG) and an optical filter in an output unit of a wavelength multiplexer, and includes a monitor that identifies wavelengths to monitor problems such as wavelength shifts. The wavelength multiplexing optical transmitter then sounds an alarm and blocks light outputted from an abnormal optical transmitter. Moreover, there is also a wavelength multiplexing optical transmitting system that measures input and output optical powers of an amplifying medium that amplifies wavelength multiplexed light, and then sets passing wavelength properties of a variable gain equalizer connected to a transmission path, based on data from a database that indicates wavelength properties for each type of transmission path.

SUMMARY

According to an aspect of the disclosed embodiments, an optical transmission device includes an extractor that extracts respective optical signals from optical signals multiplexed from a plurality of optical signals of different wavelengths, a detector that detects wavelengths of the extracted respective optical signals, a storage that stores the wavelengths of the detected respective optical signals, and a processor that is operative to derive trends in wavelength variation of the respective optical signals based on the detected respective optical signals and the respective optical signals stored in the storage, and determines that either one or both of the extractor and the detector cause the wavelengths to be varied when the trends in wavelength variation of two or more wavelengths are the same.

The object and advantages of the disclosed embodiments will be realized and attained by at least the features, elements and combinations particularly pointed out in the claims.

It is to be understood that both the foregoing general description and the following detailed description are exemplary and explanatory and are not restrictive of the disclosed embodiments, as claimed.

BRIEF DESCRIPTION OF THE DRAWINGS

FIG. 9 illustrates an example of a correction data table in the optical transmission device according to the second embodiment.

FIG. 14 illustrates an example of a correction data table in the optical transmission device according to the third embodiment.

FIG. 16 illustrates an example of a correction data table in the optical transmission device according to the fourth embodiment.

DESCRIPTION OF EMBODIMENTS

Figure 1:
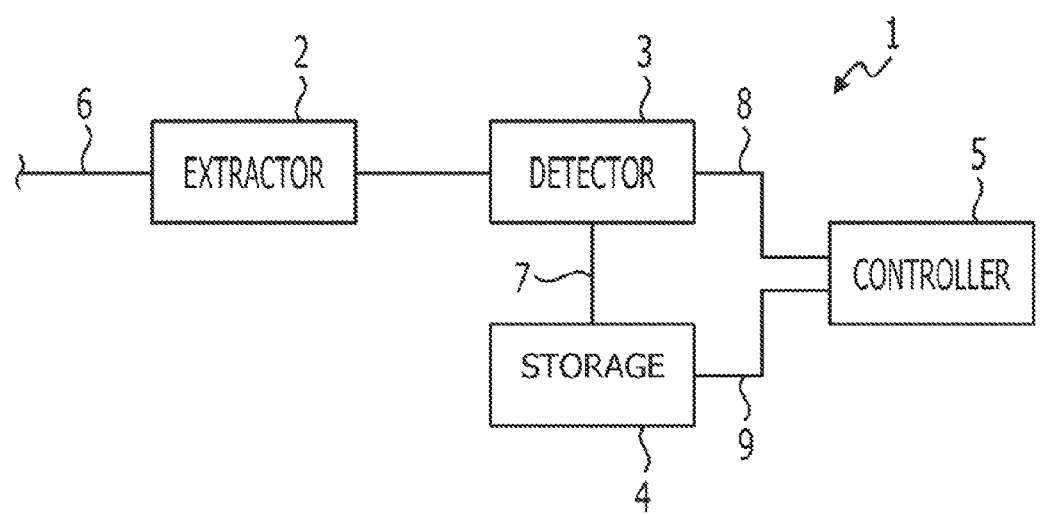
FIG. 1 is a block diagram illustrating an optical transmission device according to a first embodiment.

The displacement of optical axes inside an optical channel monitor may occur due to the displacement of the attachment positions of optical components over time since multiple optical components are mounted inside an optical channel monitor. One cause of the displacement of the attachment positions of optical components is the occurrence of distortion of the optical components due to external factors such as temperature variations and operating stress, for example. Furthermore, fixing optical components with adhesive or screws and the like may also cause stress to occur in optical components. Further, stress may also be caused by a difference in thermal expansion coefficients in places where different materials are interconnected. Further, there may also be residual stress in the optical components when the materials are fabricated. When the position and optical axis of an optical component is displaced, the wavelengths of optical signals monitored by the optical channel monitor are displaced from the original wavelength by the amount of the displacement of the position or optical axis.

However, conventional optical channel monitors cannot discern whether the cause of the detected wavelength displacement is due to a displacement of the position or optical axis of the optical component, or due to the wavelength of light incident on the optical channel monitor actually being displaced. As a result, there arises a problem in that an alarm may be sounded when a displacement of the wavelength is detected by the optical channel monitor even though the wavelength of the monitored signal is actually not displaced.

Example embodiments of an optical transmission device, an optical transmission system, and an optical transmission method are explained in detail below with reference to the accompanying drawings. In the embodiments, trends in variation of optical signal wavelengths based on present and past wavelengths of optical signals included in optical signals multiplexed from multiple optical signals of different wavelengths are derived to determine whether the wavelengths are varied due to the optical transmission device itself or a device on the optical signal transmitting side. In the following embodiments, the same configuration elements are assigned the same reference numerals, and the description thereof is omitted here.

(Embodiment1) Explanation of an Optical Transmission Device

FIG. 1 is a block diagram illustrating an optical transmission device according to a first embodiment. As illustrated in FIG. 1, an optical transmission device 1 is equipped with an extractor 2, a detector 3, a storage 4, and a controller 5. The extractor 2 extracts respective optical signals from optical signals multiplexed from multiple optical signals of different wavelengths. The detector 3 detects the wavelengths of the respective optical signals extracted by the extractor 2. The storage 4 stores the wavelengths of the respective optical signals detected by the detector 3. The controller 5 seeks trends in variation of the wavelengths of the respective optical signals based on the optical signal wavelengths stored in the storage 4 and the respective optical signal wavelengths detected by the detector 3. If the controller 5 determines that trends in variation of two or more wavelengths are the same among the respective optical signal wavelengths detected by the detector 3, the controller 5 determines that the wavelengths have varied due to either or both of the extractor 2 and/or the detector 3.

An optical path 6 such as an optical fiber or an optical waveguide is coupled to an input port of the extractor 2. The detector 3 and the storage 4 are coupled by wiring 7. The detector 3 and the controller 5 are coupled by wiring 8. The storage 4 and the controller 5 are coupled by wiring 9.

Explanation of an Optical Transmission Method

Figure 2:
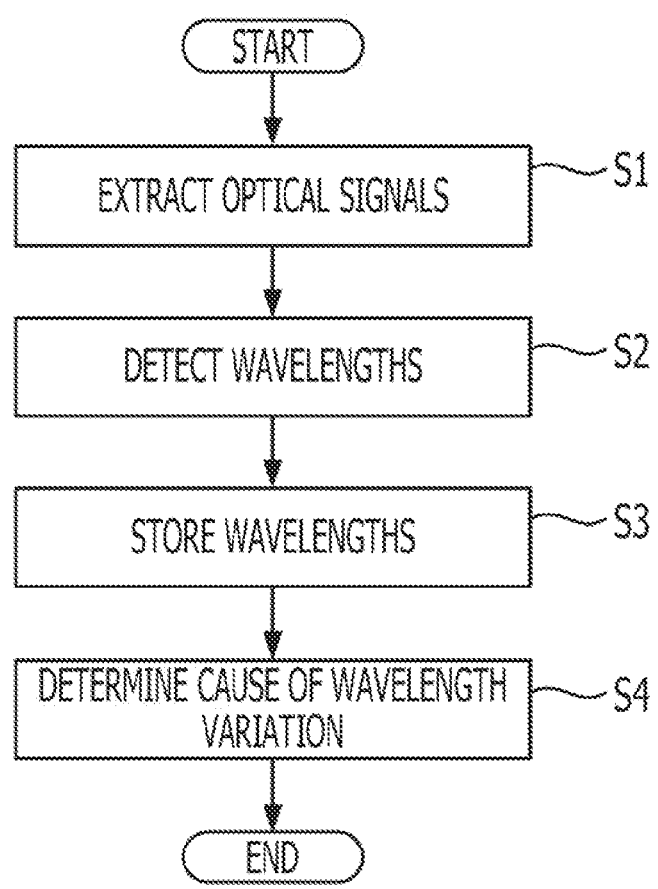
FIG. 2 is a flow chart illustrating an optical transmission method according to the first embodiment.

FIG. 2 is a flow chart illustrating an optical transmission method according to the first embodiment. As illustrated in FIG. 2, first the extractor 2 in the optical transmission device 1 extracts respective optical signals from optical signals multiplexed from multiple optical signals of different wavelengths that have been inputted into the extractor 2 from the optical path 6 (step S1). Next, the detector 3 detects the wavelengths of the respective optical signals extracted by the extractor 2 (step S2). The wavelengths detected by the detector 3 from the respective optical signals are stored in the storage 4 (step S3). Next, the controller 5 seeks trends in variation of the wavelengths of the respective optical signals based on past respective optical signal wavelengths stored in the storage 4 and the respective optical signal wavelengths detected by the detector 3. The trends are ratios indicating variation in wavelength shift amounts over a unit of time. The controller 5 determines that the wavelengths have varied due to one or both of the extractor 2 and the detector 3 when trends in variation in two or more wavelengths are almost the same. That is, the controller 5 determines that a variation in wavelengths has occurred due to a problem in the optical transmission device 1 itself (step S4).

According to the first embodiment, the optical transmission device 1 determines that the cause of the variation in the wavelengths is the optical transmission device 1 itself when the trends in variation of two or more wavelengths are the same. Therefore, when it is determined that there is no problem with the optical transmission device 1 itself when a variation in wavelengths occurs, the optical transmission device 1 can detect that the cause is in a device on the optical signal transmitting side. Specifically, the optical transmission device 1 can detect displacement of optical signal wavelengths when the cause of the displacement is a device on the optical signal sending side.

(Embodiment 2)

A second embodiment is an example of the application of an optical transmission device in an optical channel monitor.

Optical Transmission Device Explanation

Figure 3:
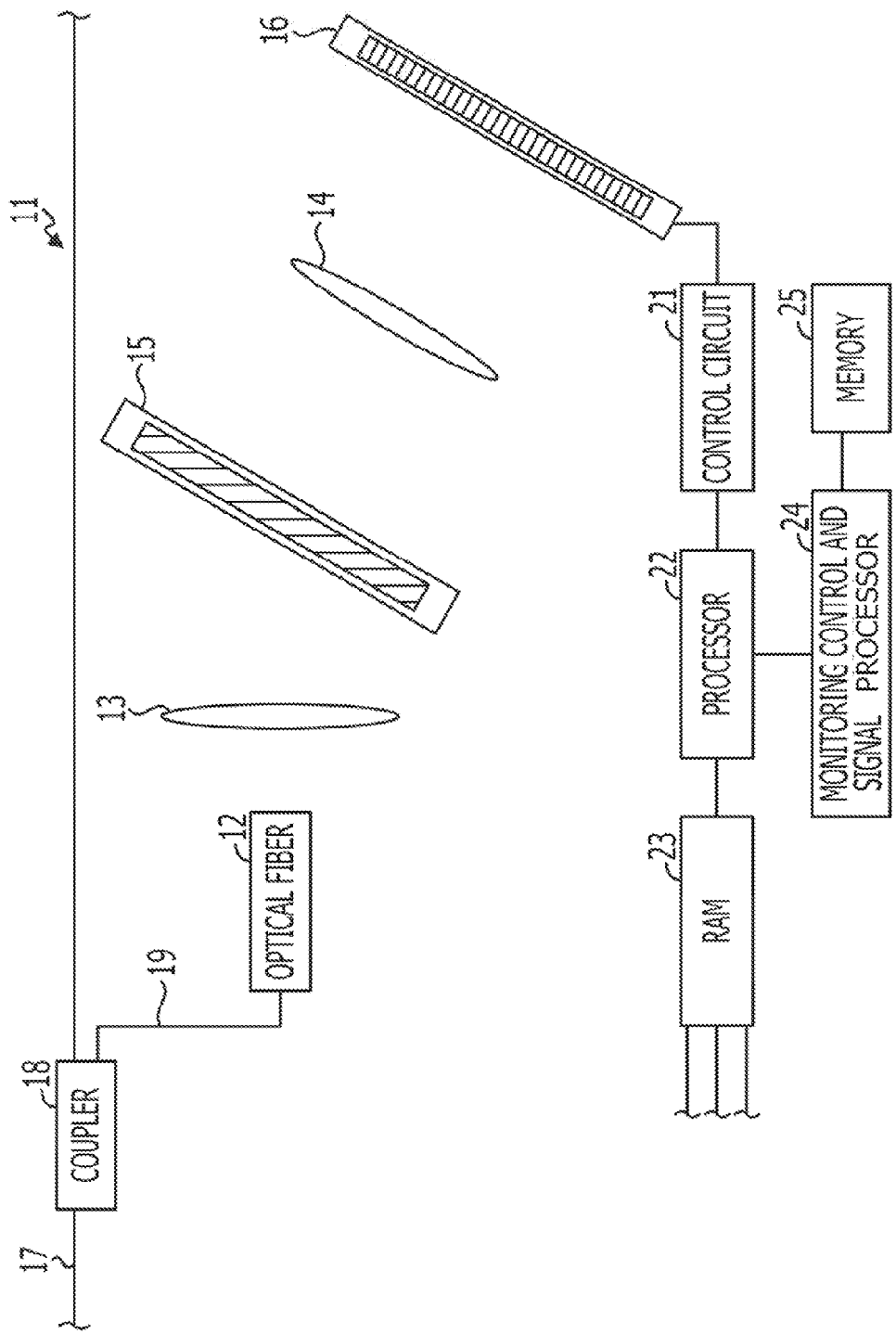
FIG. 3 is a block diagram illustrating an optical transmission device according to a second embodiment.

FIG. 3 is a block diagram illustrating an optical transmission device according to a second embodiment. As illustrated in FIG. 3, an optical channel monitor 11 is equipped with optical fiber 12, lenses 13 and 14, a wavelength division demultiplexer 15 as an example of an extractor, and a light receiving element 16 as an example of a detector. Optical signals multiplexed from multiple optical signals of different wavelengths are transmitted through an optical path 17. A portion of the optical signals transmitted through the optical path 17 are branched at a coupler 18 and inputted into the optical fiber 12 via an optical path 19. The optical signals emitted from the optical fiber 12 pass through the optical fiber 12 and the lens 13 configured as a collimator. The optical signals are then dispersed into wavelength components by the wavelength division demultiplexer 15, pass through the lens 14, and are received in each wavelength component by the light receiving element 16.

Examples of wavelength division demultiplexers 15 include grating and arrayed-waveguide diffraction lattices. Examples of light receiving elements include photo diode (PD) arrays, linear sensors, and line sensors. A relationship between positions on the light receiving element 16 and wavelengths is previously arranged so that $\lambda 1$ is a light wavelength incident into a position X1 on the light receiving element 16, and $\lambda 2$ is a light wavelength incident into a different position X2. The light receiving element 16 outputs powers of the received light at each of the positions on the light receiving element 16 as electrical signals converted to monitor powers.

The optical channel monitor 11 includes a control circuit 21, a processor 22 such as a digital signal processor (DSP), and a random access memory (RAM) 23. The control circuit 21 controls the light receiving element 16. For example, the control circuit 21 applies a reverse bias to the photo diodes of the light receiving element 16. The processor 22 receives the monitor powers from the light receiving element 16 through the control circuit 21. The processor 22 estimates a spectrum shape for each channel based on the monitor powers and computes a center wavelength from all the inputted powers and wavelength monitor values and wavelength monitor values for each channel. The RAM 23 stores the computing results of the processor 22 and outputs the results to, for example, a host (not illustrated).

The optical channel monitor 11 further includes a signal processor 24 as an example of a controller and a processor, and a memory 25 as an example of a storage. The signal processor 24 derives the amount of wavelength variation for each channel based on current wavelength monitor values obtained from the processor 22 and past wavelength monitor values stored in the memory 25, and then determines whether the wavelengths have varied in a shortening direction or varied in a lengthening direction. The signal processor 24 compares the amount of variation in wavelengths between the channels and the directions of the variation in the wavelengths.

Figure 4:
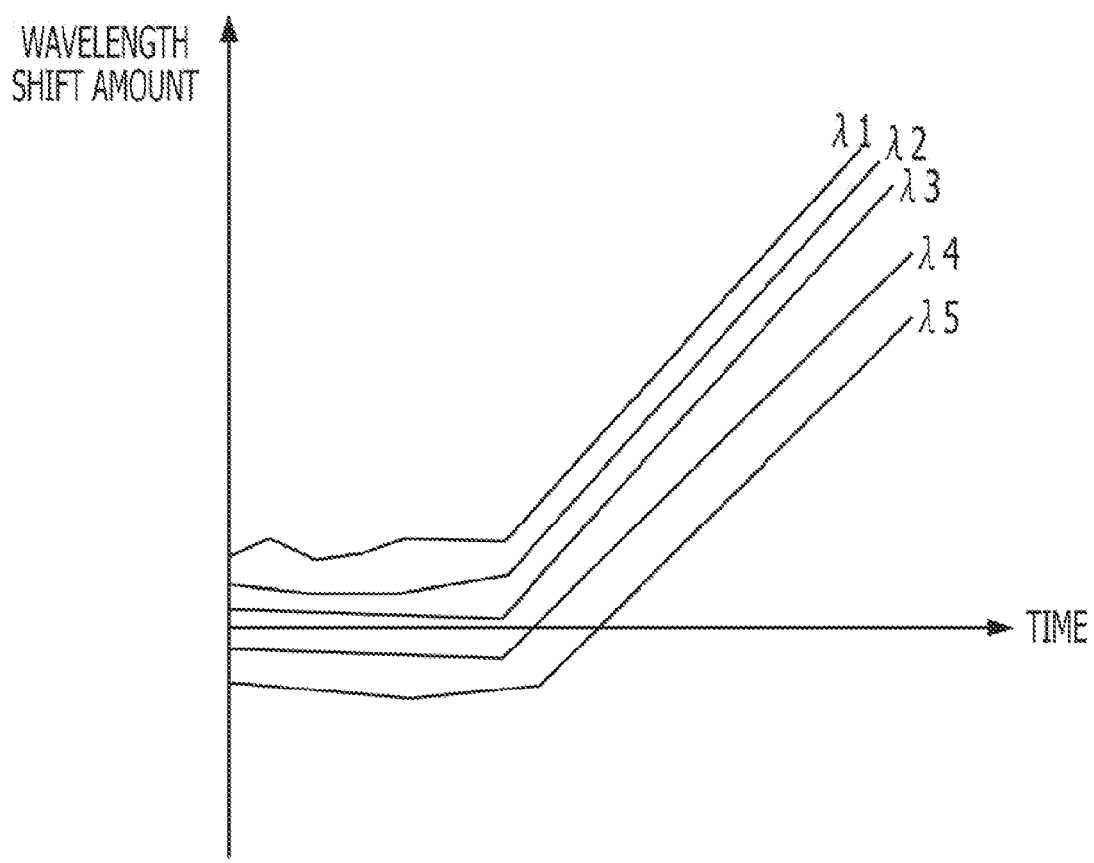
FIG. 4 illustrates properties indicating an example of temporal variation of a wavelength variation amount.

The signal processor 24 determines that the cause of variations in the wavelengths is the optical channel monitor 11 when the amount of wavelength variation and the direction of wavelength variation in two or more channels is almost the same (see FIG. 4). FIG. 4 illustrates properties indicating an example of temporal variation in wavelength variation amounts (wavelength shift amounts). In the example illustrated in FIG. 4, the total wavelengths of $\lambda 1$ to $\lambda 5$ have almost the same trends in wavelength variation. As a result, in this case, the cause of the variation in wavelengths is the optical channel monitor 11.

The following is an example of variations in wavelengths caused by the optical channel monitor 11. For example, the attachment position or angle of optical components such as the fiber 12, the lenses 13 or 14, the wavelength division demultiplexer 15, or the light receiving element 16 may be displaced due to the effect of differences in thermal expansion coefficients or due to the alleviation of internal stress and the like. If the position or angle of these optical components is displaced, the angle of emergence of light from the wavelength division demultiplexer 15 and the angles of emergence of the wavelength components from the wavelength division demultiplexer 15 become displaced thus eventually causing the positions of incidence of the optical signals of the wavelength components to be displaced from the previously set positions in the light receiving element 16. As a result, displacement in the wavelength monitor values derived by the processor 22 occurs even though the wavelengths of the optical signals incident into the light receiving element 16 have not changed.

Figure 5:
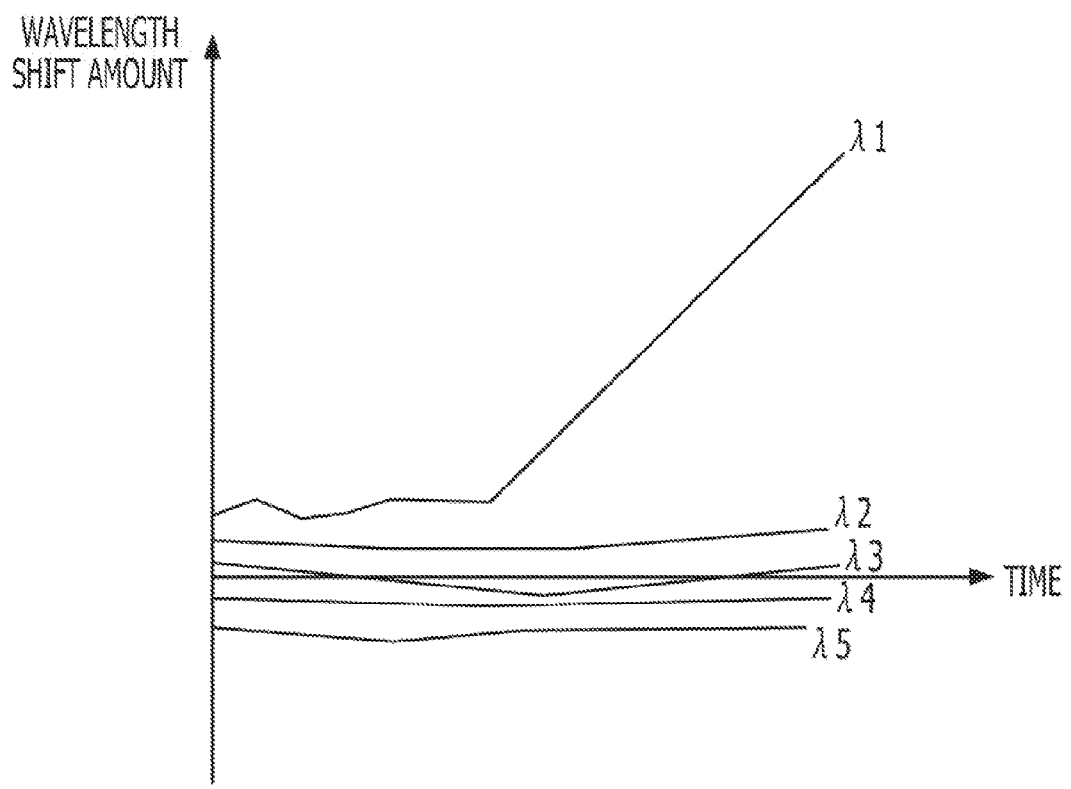
FIG. 5 illustrates properties indicating an example of temporal variation of a wavelength variation amount.

The signal processor 24 determines that when the variation amount of a wavelength of a certain channel and the direction of the wavelength variation are different from the other channels (see FIG. 5), the cause of the variation in the wavelength of the channel in question is a device on the transmitting side of that channel. FIG. 5 illustrates properties indicating an example of temporal variation in wavelength variation amounts (wavelength shift amounts). In the example illustrated in FIG. 5, the wavelength $\lambda 1$ varies but the remaining wavelengths $\lambda 2$ to $\lambda 5$ indicate almost no variation. Hence, in this case, the cause of the displacement of the wavelength is in the $\lambda 1$ channel device on the transmitting side.

Figure 6:
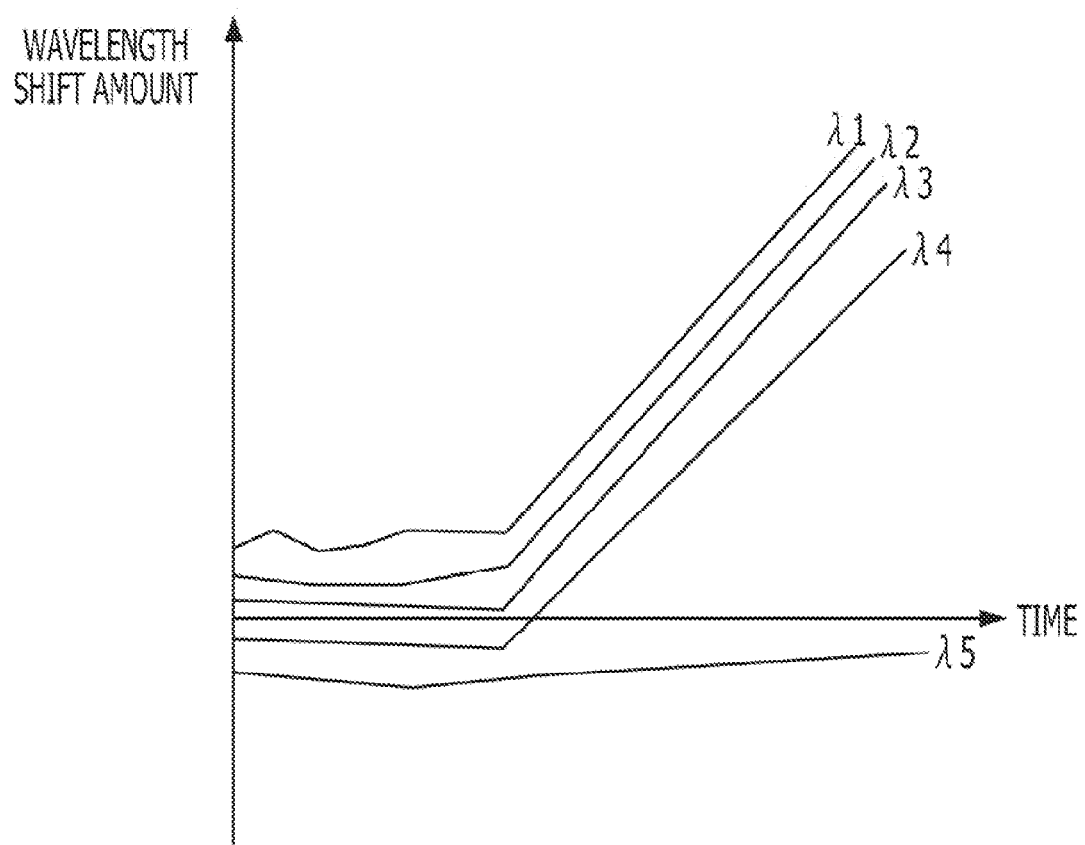
FIG. 6 illustrates properties indicating an example of temporal variation of a wavelength variation amount.
Figure 7:
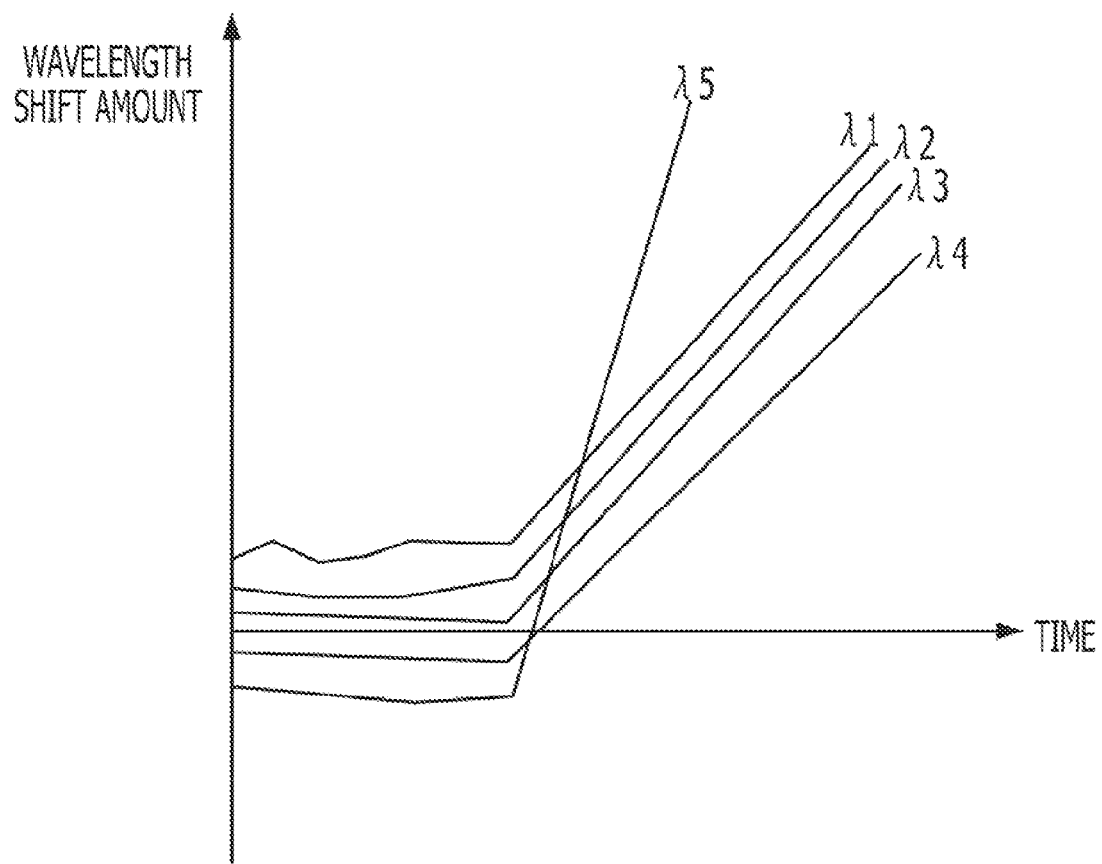
FIG. 7 illustrates properties indicating an example of temporal variation of a wavelength variation amount.

FIGS. 6 and 7 illustrate other examples where the wavelength variation amount and the wavelength variation direction of one channel are different from the other channels, and the wavelengths of all channels except one vary in the same way. FIGS. 6 and 7 illustrate properties indicating an example of temporal variation in wavelength variation amounts (wavelength shift amounts). In the examples illustrated in FIGS. 6 and 7, the wavelengths of $\lambda 1$ to $\lambda$ vary in the same way except for the $\lambda 5$ channel. These cases illustrate two conditions occurring at the same time: a condition in which variation in all the wavelengths is caused by the optical channel monitor 11, and a condition in which variation in the wavelength of $\lambda 5$ is caused by a device on the $\lambda 5$ channel transmitting side.

In the example illustrated in FIG. 6, the direction of the variation in the $\lambda 5$ wavelength due to the optical channel monitor 11, and the direction of the variation in the $\lambda 5$ wavelength due to the device on the $\lambda 5$ transmitting side are opposite directions and thus cancel each other out. In the example illustrated in FIG. 7, the direction of the variation in the $\lambda 5$ wavelength due to the optical channel monitor 11, and the direction of the variation in the $\lambda 5$ wavelength due to the device on the $\lambda 5$ transmitting side are in the same direction and thus are added together. In this case, the signal processor 24 can determine that both the optical channel monitor 11 and a device on the $\lambda 5$ channel transmitting side cause the variation in the wavelength.

Moreover, the signal processor 24 corrects the wavelength monitor values of the channels based on the wavelength variation when the optical channel monitor 11 is determined to be the cause of the wavelength variation. Correction of the wavelength monitor values is described below. Alternatively, instead of correcting the wavelength monitor values, the signal processor 24 may also correct a threshold for sounding an alarm when variation in a wavelength is caused by a transmitter side device, based on the amount of wavelength variation. Correction of the threshold for sounding an alarm is described below.

Figure 8:
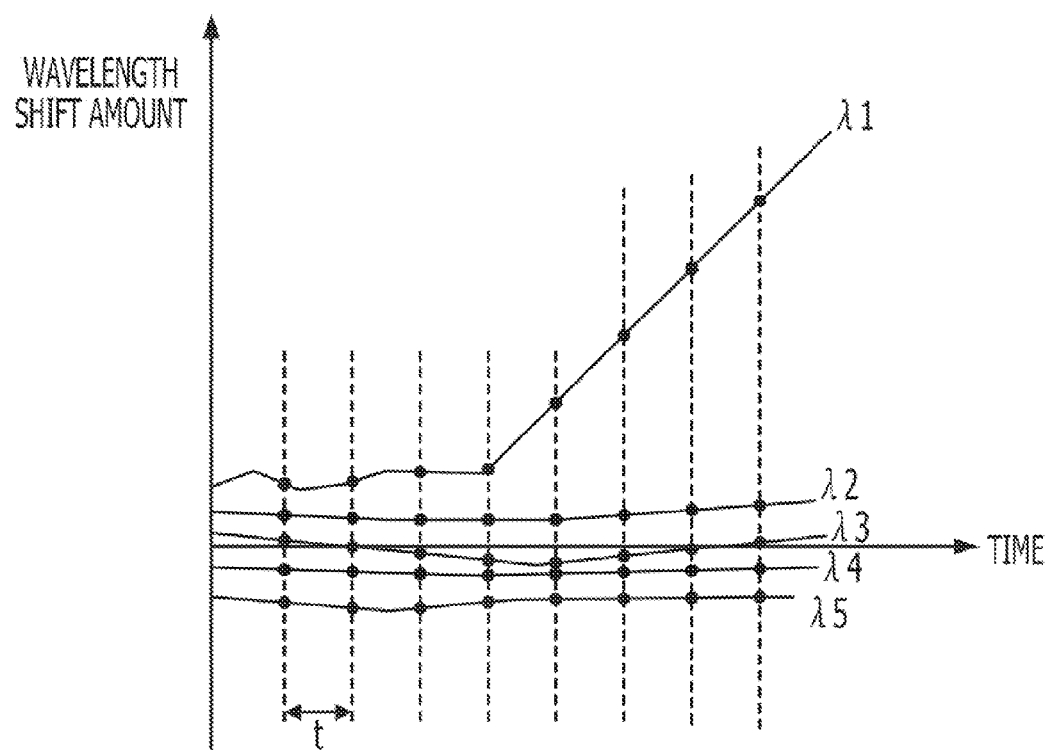
FIG. 8 illustrates stored timings of wavelength monitor values.

The memory 25 receives wavelength monitor values for each channel via the signal processor 24 and periodically stores the wavelength monitor values for each channel. The memory 25 may be a non-volatile memory such as a flash memory, for example. The monitoring operation for monitoring the wavelength monitor values of each channel may be conducted in intervals of between several hundred milliseconds to several seconds in the optical channel monitor 11, for example. As illustrated in FIG. 8, an interval t for storing the wavelength monitor values of each channel in the memory 25 may be several hours. FIG. 8 illustrates storing timings of wavelength monitor values. Black dots in FIG. 8 indicate the timing of storing the wavelength monitor values.

The signal processor 24 may determine whether or not the cause of variation in the wavelengths is due to the optical channel monitor 11 at the time the wavelength monitor values are stored in the memory 25. Specifically, the signal processor 24 may determine whether or not the cause of variation in the wavelengths is due to the optical channel monitor 11 at a ratio of one time per several hours or so. The reason for this is that variations in wavelengths caused by the optical channel monitor 11 do not occur in short intervals.

Correction of Wavelength Monitor Values

FIG. 9 is an example of a table of correction data for correcting the wavelength monitor values. A correction data table 31 may be stored, for example, in the memory 25. The signal processor 24 may derive the amount (offset amount, wavelength shift amount) that the wavelength monitor values fluctuate due to the optical channel monitor 11 based on trends in the variation of past wavelength monitor values stored in the memory 25. For example, the signal processor 24 may render the spot where a large difference in the averages of several past wavelength monitor values occurred as a variation branch point and then derive an offset value from the difference between a point where the past wavelength monitor value averages were stable and a current wavelength monitor value point.

The signal processor 24 may also correct the wavelength monitor values by uniformly adding or subtracting an amount of voltage corresponding to the offset value, to or from the wavelength monitor values derived by the processor 22. For example, in the example of table 31 illustrated in FIG. 9, a wavelength monitor value derived by the processor 22 may be raised by 200 mV above the original value when the offset amount is +0.20 nm. The signal processor 24 may uniformly reduce 200 mV from the wavelength monitor values derived by the processor 22.

Correction of Threshold for Sounding Alarm

Figure 10:
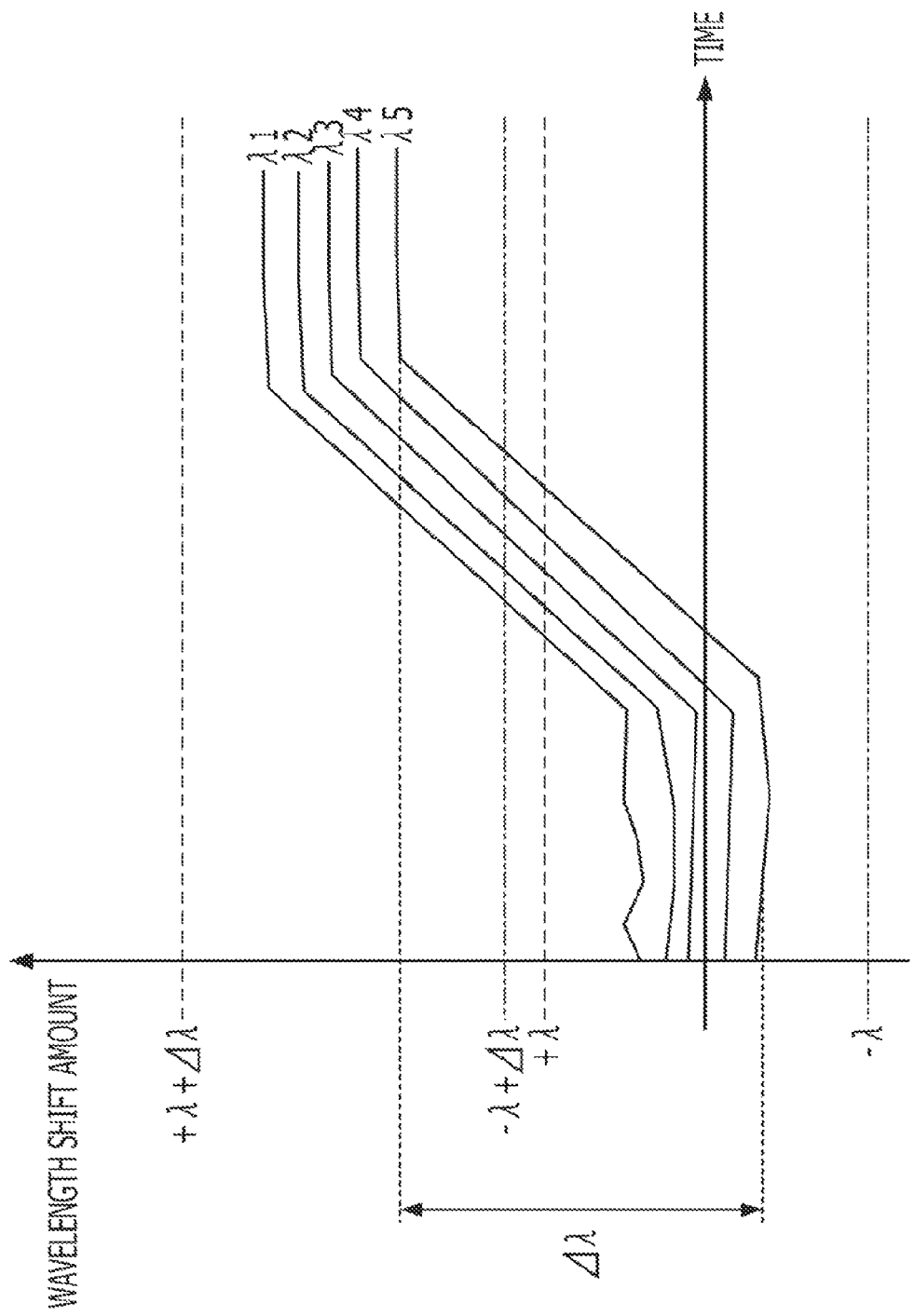
FIG. 10 illustrates the correction of a threshold value for generating an alarm in the optical transmission device according to the second embodiment.

FIG. 10 illustrates the correction of a threshold for sounding an alarm. In FIGS. 10, $-\lambda$, and $+\lambda$, respectively indicate thresholds for sounding an alarm when the amount of variation of the wavelengths changes toward the minus direction (short wavelength direction) and the plus direction (long wavelength direction). An alarm is sounded in the optical channel monitor 11 when a wavelength monitor value crosses the $-\lambda$, or the $+\lambda 2$, threshold. As illustrated in FIG. 10, when the wavelength monitor values fluctuate due to the optical channel monitor 11 and the amount of fluctuation (offset amount) is $\Delta\lambda$, the signal processor 24 may correct the threshold for sounding the alarm from $-\lambda$ to $-\lambda+\Delta\lambda$, and from $+\lambda$, to $+\lambda+\Delta\lambda$.

For example, when the original threshold for sounding the alarm is ±0.1 nm and the wavelength monitor value is displaced +0.05 nm due to the optical channel monitor 11, the signal processor 24 may make the offset amount +0.05 nm. As a result, the signal processor 24 may set new thresholds for sounding the alarm to −0.05 nm and +0.15 nm.

Explanation of an Optical Transmission Method

Figure 11:
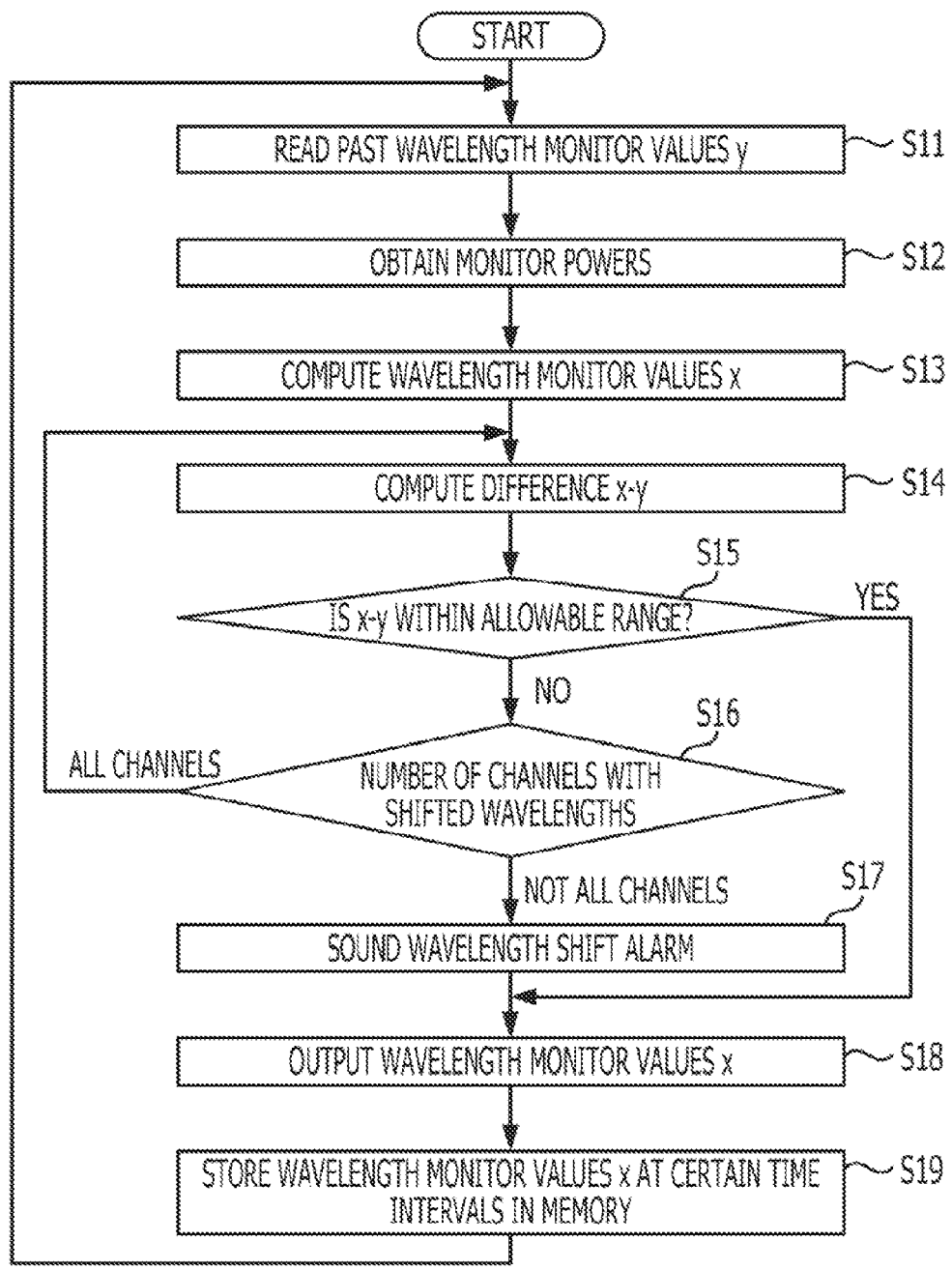
FIG. 11 is a flow chart illustrating an optical transmission method according to the second embodiment.

FIG. 11 is a flow chart illustrating an optical transmission method according to a second embodiment. As illustrated in FIG. 11, the signal processor 24 first reads past wavelength monitor values y from the memory 25 (step S11). Next, the processor 22 obtains monitor powers of wavelength components from the light receiving element 16 (step S12) and computes current wavelength monitor values x of the wavelength components (step S13). At this time a correction value d has the initial value 0. Next, the signal processor 24 subtracts the past wavelength monitor values y from the current wavelength monitor values x for each wavelength component (step S14). The signal processor 24 then determines whether the values for x-y for all the wavelength components are within a threshold range (step S15).

When the x-y values for all the wavelength components are within the threshold range (step S15: Yes), the signal processor 24 outputs the current wavelength monitor values x of each wavelength component to the processor 22 (step S18). The current wavelength monitor values x are outputted to a host (not illustrated) via the RAM 23. Moreover, the signal processor 24 stores the current wavelength monitor values x of each wavelength component in the memory 25 at certain time intervals (step S19). Then the process returns to step S11.

On the other hand, when the values of x-y for all the wavelength components are not within the threshold range (step S15: No), the signal processor 24 searches for the number of channels whose value for x-y is not within the threshold range, that is, the number of channels whose wavelengths may be considered to have shifted, and then conducts processing according to that number (step S16). When the wavelengths in all the channels are considered to have shifted (step S16: all channels), the process returns to step S14 and the signal processor 24 conducts the processing from step S14. When the wavelengths in all the channels cannot be considered to have shifted (step S16: not all channels), the signal processor 24 determines that the wavelength variation is caused by a device on the transmitted side and then sounds an alarm (step S17). The signal processor 24 then proceeds to step S18 and conducts the processing from step S18.

The signal processor 24 may be implemented by a program that is made to implement the above operations by a processor. Alternatively, the signal processor 24 may be implemented by hardware.

Figure 12:
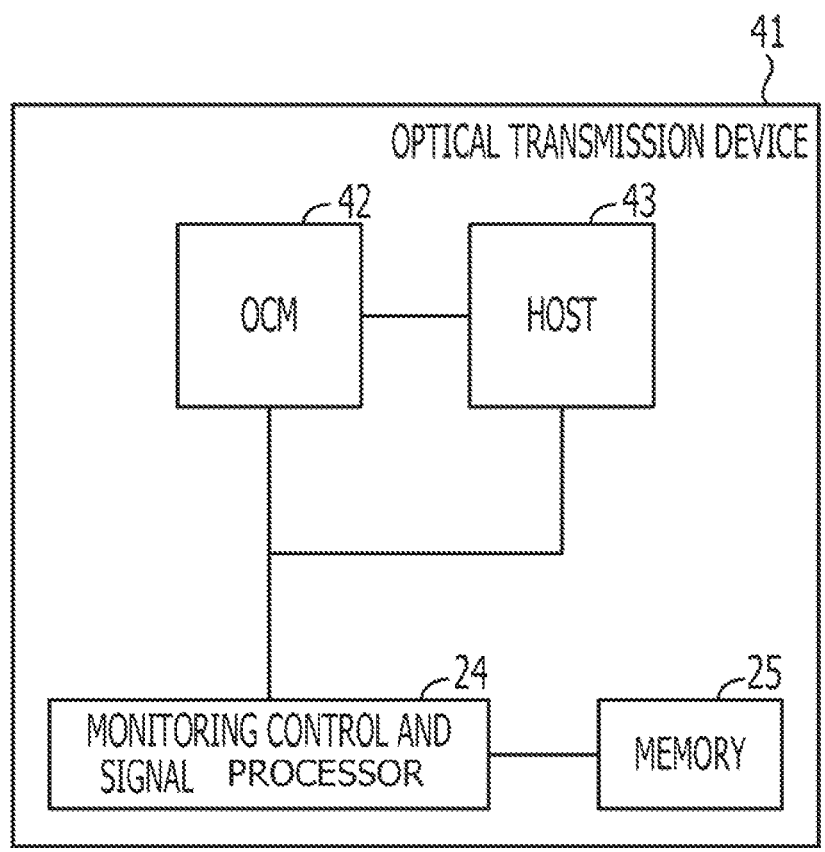
FIG. 12 is a block diagram illustrating another example of the optical transmission device according to the second embodiment.

A configuration as illustrated in FIG. 12 may also be implemented. FIG. 12 is a block diagram illustrating another example of the optical transmission device. As illustrated in FIG. 12, an optical transmission device 41 is equipped with an optical channel monitor module 42, the signal processor 24, the memory 25, and a host 43. The optical channel monitor module 42 is configured without the signal processor 24 or the memory 25 that are included in the optical channel monitor 11 illustrated in FIG. 3.

The same effects as the first embodiment may be achieved with the second embodiment.

(Embodiment 3)

A third embodiment is an example of the application of an optical transmission device in another type of optical channel monitor.

Optical Transmission Device Explanation

Figure 13:
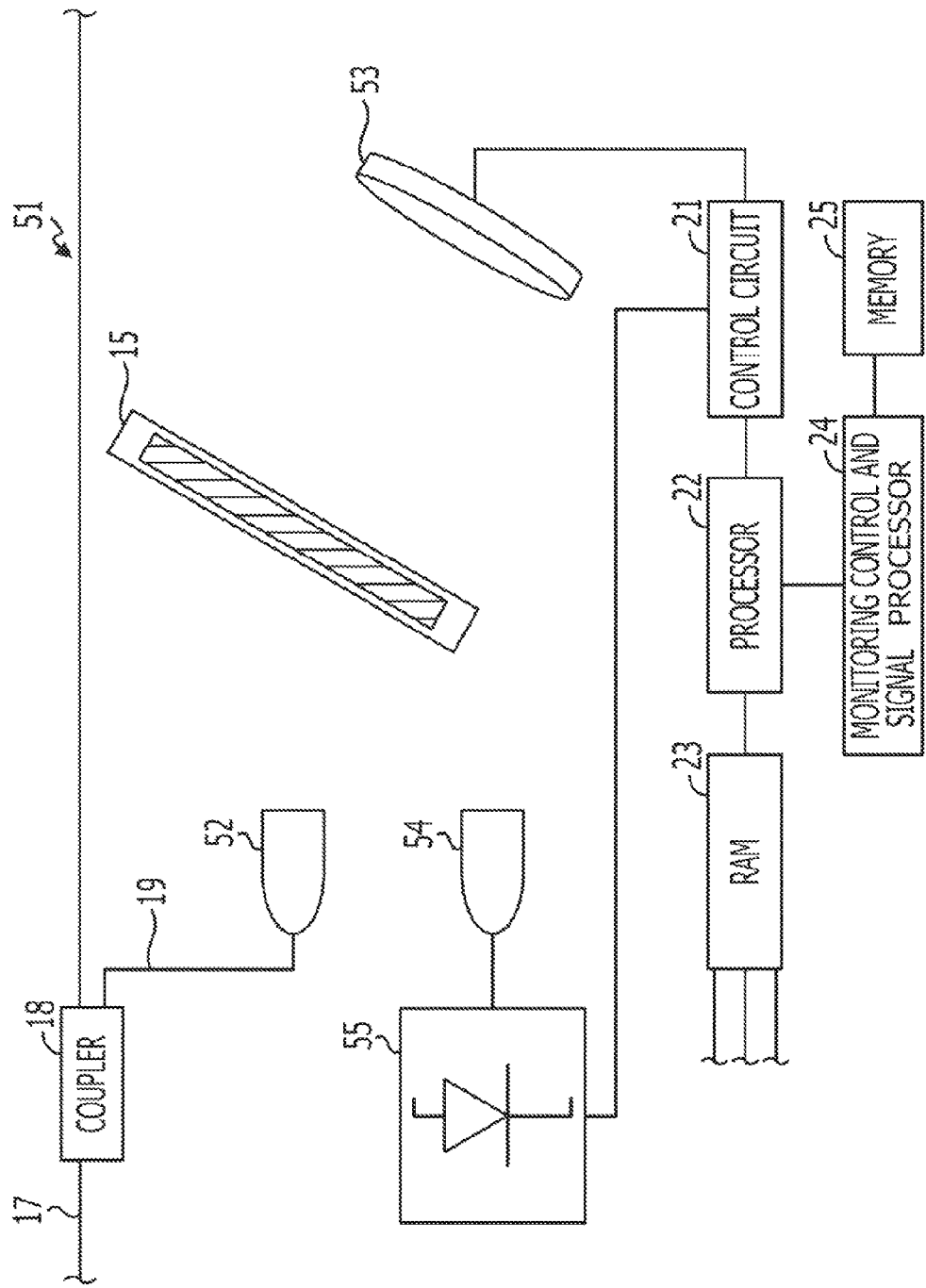
FIG. 13 is a block diagram illustrating an optical transmission device according to a third embodiment.

FIG. 13 is a block diagram illustrating an optical transmission device according to the third embodiment. As illustrated in FIG. 13, in an optical channel monitor 51 according to the third embodiment, optical signals branched at a coupler 18 are guided to a collimator 52 through an optical path 19. The optical signals emitted by the collimator 52 are dispersed into wavelength components by a wavelength division demultiplexer 15 such as a grating or arrayed-waveguide lattice. The optical signals of the wavelength components are reflected by a micro-electro-mechanical system (MEMS) mirror 53. The optical signal wavelength components reflected by the MEMS mirror 53 pass through a collimator 54 to be repeatedly incident on a photo diode 55 by causing the angle of the MEMS mirror 53 to be repeatedly changed by a control circuit 21. The processor 22 estimates a spectrum shape for each channel based on the monitor powers for each time, that is the monitor powers of each wavelength component, and computes a center wavelength from all of the inputted powers and the wavelength monitor values for each channel. Other configurations are the same as the second embodiment.

The angle of the MEMS mirror 53 is controlled by control voltage values outputted by the control circuit 21. The control voltage values are previously associated with the wavelength components of the optical signals that pass through the collimator 54 and are incident on the photo diode 55. Therefore, when the control voltage values outputted by the control circuit 21 and the angle of the MEMS mirror 53 vary, the wavelength components of the optical signals incident on the photo diode 55 are different from the expected wavelength components. As a result, displacement of the wavelength monitor values derived by the processor 22 occurs even if the wavelengths of the optical signals incident on the photo diode 55 do not vary. Moreover, displacement of the wavelength monitor values derived by the processor 22 occurs when displacement of the attachment position or angle of an optical component such as the collimators 52 or 54, or the wavelength division demultiplexer 15 occurs as in the second embodiment.

When it is determined that the cause of the variation in the wavelengths is due to the optical channel monitor 51, the signal processor 24 may correct the wavelength monitor values in the same way as in the second embodiment. Alternatively, instead of correcting the wavelength monitor values, the signal processor 24 may correct the control voltage values to adjust the angle of the MEMS mirror 53.

Correction of MEMS Mirror Angle

FIG. 14 illustrates an example of a table of correction data for the control voltage value to control the angle of the MEMS mirror. A correction data table 32 may be stored, for example, in the memory 25. The signal processor 24 may add or subtract an amount of voltage corresponding to an offset value (amount of fluctuation of the wavelength monitor value) derived in the same way as in the second embodiment, to or from the control voltage value to control the angle of the MEMS mirror 53. In this way the control state of the MEMS mirror 52 can be returned to the proper state. For example, in the table 32 illustrated in FIG. 14, a displacement amount of +100 mV of the control voltage value to control the angle of the MEMS mirror 53 corresponds to a MEMS mirror 53 angle of +0.2 degrees, and to an offset value of +0.10 nm. Therefore, if the offset value is +0.20 nm, the signal processor 24 may correct the control voltage value to control the angle of the MEMS mirror 53 from the current value with a low voltage value of 200 mV.

The same effects as the first embodiment may be achieved with the third embodiment. The configuration of the third embodiment may be the same as the configuration illustrated in FIG. 12.

(Embodiment 4)

A fourth embodiment is an example of the application of an optical transmission device in another type of optical channel monitor.

Optical Transmission Device Explanation

Figure 15:
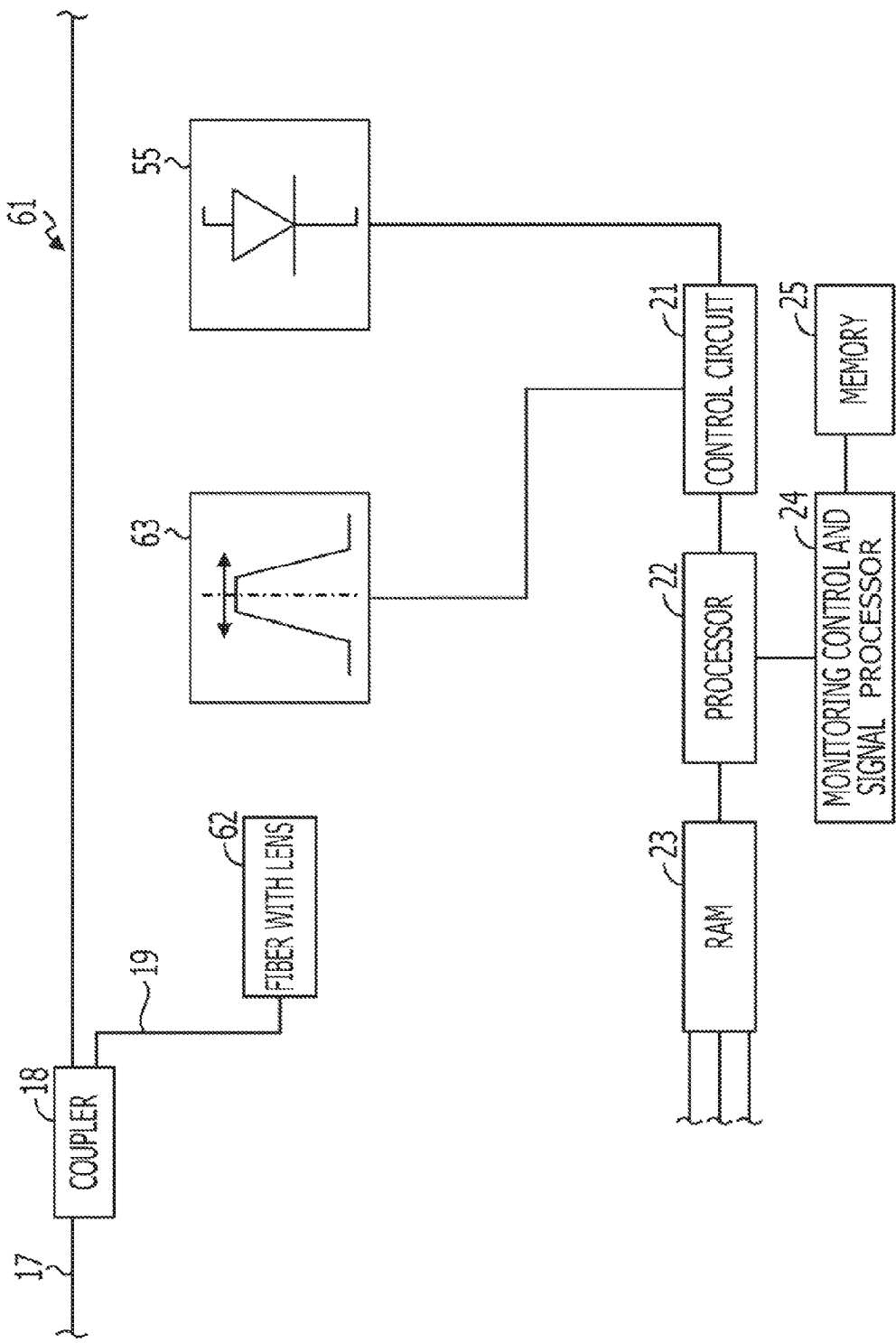
FIG. 15 is a block diagram illustrating an optical transmission device according to a fourth embodiment.

FIG. 15 is a block diagram illustrating an optical transmission device according to a fourth embodiment. As illustrated in FIG. 15, in an optical channel monitor 61 of the fourth embodiment, optical signals branched at a coupler 18 are guided to a fiber with lens 62 through an optical path 19. Optical signals emitted from the fiber with lens 62 are dispersed into wavelengths by a wavelength division demultiplexer 63 such as a tunable filter in which transparent wavelengths can be varied by controlling the temperature. The optical signals of the wavelength components that pass through the wavelength division demultiplexer 63 are received by the photo diode 55 through the control of the temperature of the wavelength division demultiplexer 63 by the control circuit 21. The processor 22 estimates a spectrum shape for each channel according the monitor powers for each time, in other words the monitor power of each wavelength component, and computes a center wavelength from all the inputted powers and wavelength monitor values for each channel. Other configurations are the same as the second embodiment.

The transparent wavelengths of the wavelength division demultiplexer 63 vary due to the temperature of the wavelength division demultiplexer 63 and the incidence angle of the optical signals toward the wavelength division demultiplexer 63. The transparent wavelengths of the wavelength division demultiplexer 63 are previously associated with the temperature and the rotation angle of the wavelength division demultiplexer 63. Therefore, variation in the transparent wavelength of the wavelength division demultiplexer 63 due to variation in temperature or rotation angle of the wavelength division demultiplexer 63 leads to differences between the optical signal wavelength components incident on the photo diode 55 and the expected wavelength components. As a result, displacement of the wavelength monitor values derived by the processor 22 occurs even if the wavelengths of the optical signals incident on the photo diode 55 do not vary. Moreover, similar to the second embodiment, displacement of the wavelength monitor values derived by the processor 22 occurs due to variation in the optical signal incidence angle toward the wavelength division demultiplexer 63 when the angle of an optical component such as the fiber with lens 62 is displaced.

When it is determined that the cause of the variation in the wavelengths is due to the optical channel monitor 61, the signal processor 24 may correct the wavelength monitor values in the same way as in the second embodiment. Alternatively, instead of correcting the wavelength monitor values, the signal processor 24 may correct a control voltage value to adjust the temperature of the wavelength division demultiplexer 63.

Correction of Temperature of Wavelength Division Demultiplexer

FIG. 16 illustrates an example of a table of correction data for correcting the control voltage value to control the temperature of the wavelength division demultiplexer. A correction data table 33 may be stored, for example, in the memory 25. The signal processor 24 may add or subtract an amount of voltage corresponding to an offset value (amount of fluctuation of the wavelength monitor value) derived in the same way as in the second embodiment, to or from the control voltage value to control the temperature of the wavelength division demultiplexer 63. As a result, a control state of the wavelength division demultiplexer 63 can be returned to a proper state. For example, in the table 33 illustrated in FIG. 16, a displacement amount of +100 mV of the control voltage value to control the temperature of the wavelength division demultiplexer 63 corresponds to a wavelength division demultiplexer 63 temperature of +1.0 degrees Celsius, and to an offset value of +0.10 nm. Therefore, if the offset value is +0.20 nm, the signal processor 24 may correct the control voltage value to control the temperature of the wavelength division demultiplexer 63 from the current value with a low voltage value of 200 mV.

The same may be applicable for a type of optical channel monitor other than the type that controls a MEMS mirror angle or the type that controls a wavelength division demultiplexer temperature. More specifically, parameters for controlling the angles or positions of components such as optical components included in an optical channel monitor, or for controlling the selection of wavelengths may be corrected by an amount corresponding to the offset amount depending upon the type of optical channel monitor. A table of correction data used for such corrections may be stored, for example, in the memory 25 in the same way as the second, third, and fourth embodiments.

The same effects as the first embodiment may be achieved with the fourth embodiment. The configuration of the fourth embodiment may be the same as the configuration illustrated in FIG. 12.

(Embodiment 5)

A fifth embodiment is an example of an optical transmission system including an optical channel monitor.

Figure 17:
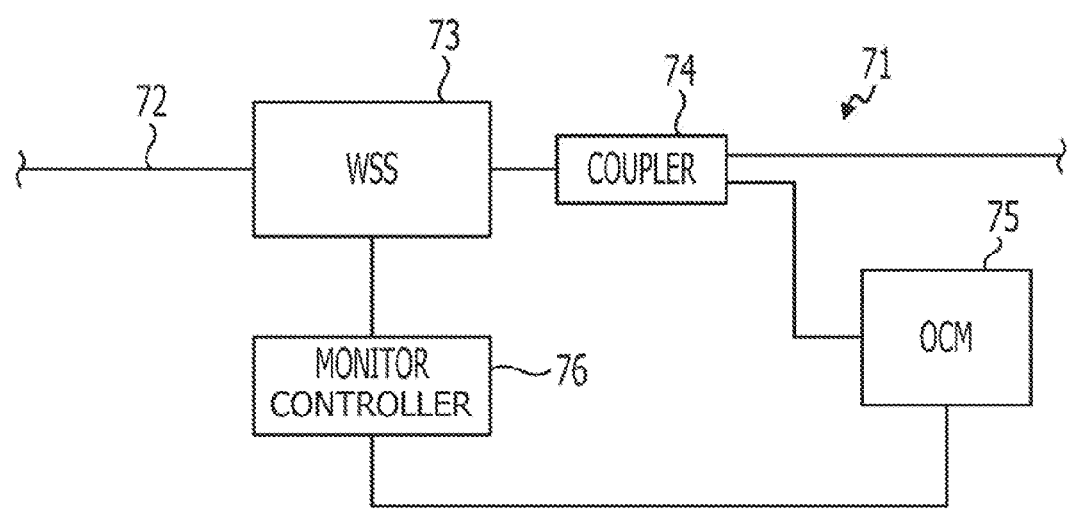
FIG. 17 is a block diagram of an optical transmission system according to a fifth embodiment.

FIG. 17 is a block diagram of an optical transmission system according to a fifth embodiment. As illustrated in FIG. 17, an optical transmission system 71 of the fifth embodiment monitors fluctuations in wavelengths with an optical channel monitor 75 by causing a portion of optical signals outputted from a wavelength selectable switch 73 in an optical path 72 to be branched by a coupler 74 and inputted into the optical channel monitor 75. The optical channel monitor 75 may be one of the types described above in the second, third or fourth embodiments, or another type. A monitor controller 76 controls attenuators of the wavelength selectable switch 73 according to wavelength monitor values of the wavelengths outputted from the optical channel monitor 75.

When the optical channel monitor 75 detects displacement of a wavelength of an optical signal inputted therein, the monitor controller 76 turns off the attenuator corresponding to the channel of the displaced wavelength of the wavelength selectable switch 73. On the other hand, when the optical channel monitor 75 detects that the cause of the wavelength displacement is in the optical channel monitor 75, the optical channel monitor 75 may correct the wavelength monitor values of the wavelengths in the optical channel monitor 75 in the same way as in the second, third, or fourth embodiments. Furthermore, the optical channel monitor 75 may correct a parameter for controlling the angle or position of components such as optical components included in the optical channel monitor 75, or for controlling wavelength selection. In this way, the monitor controller 76 can continuously control the wavelength selectable switch 73 by making corrections inside the optical channel monitor 75.

The optical transmission system 71 may keep a log indicating corrections inside the optical channel monitor 75 and may notify a system operator when corrections are conducted inside the optical channel monitor 75. Thus, the system operator can be informed that corrections were conducted inside the optical channel monitor 75. Moreover, the system operator can be made aware that inspection and repair of the optical channel monitor 75 may be necessary when inspecting the optical transmission system 71.

(Embodiment 6)

A sixth embodiment describes an example of another optical transmission system equipped with an optical channel monitor.

Figure 18:
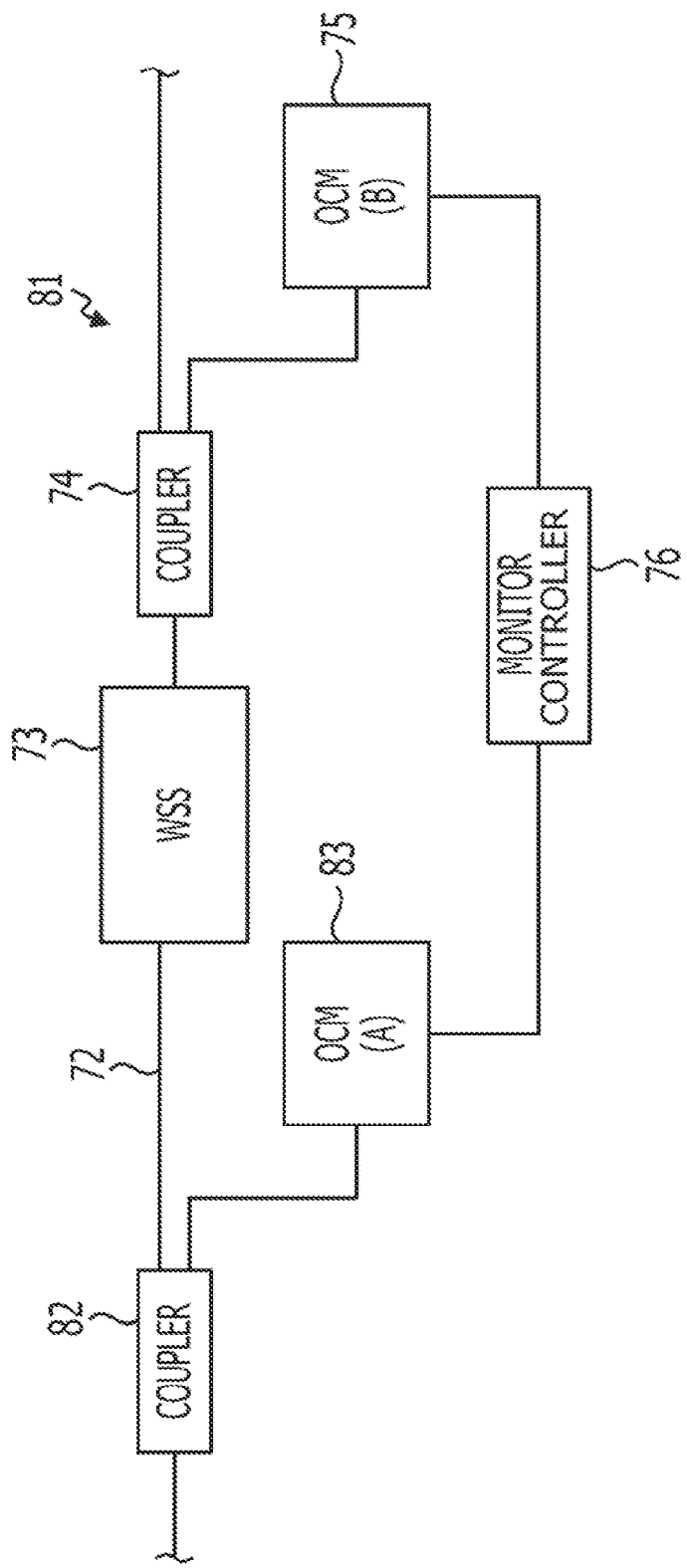
FIG. 18 is a block diagram of an optical transmission system according to a sixth embodiment.

FIG. 18 is a block diagram of an optical transmission system according to a sixth embodiment. As illustrated in FIG. 18, an optical transmission system 81 of the sixth embodiment detects defects in or damage to optical channel monitors 75 and 83 by causing a portion of the optical signals to be inputted into the wavelength selectable switch 73 to be branched by a coupler 82 as in the optical transmission system according to the fifth embodiment, and then monitoring, with the optical channel monitor 83, fluctuations in the wavelengths of optical signals inputted into the wavelength selectable switch 73. A monitor controller 76 compares the wavelength monitor values of wavelengths outputted by the optical channel monitor (indicated as (A)) 83 provided upstream from the wavelength selectable switch 73, with the wavelength monitor values of the wavelengths outputted by the optical channel monitor (indicated as (B)) 75 provided downstream from the wavelength selectable switch 73. In this way, the monitor controller 76 can determine whether the wavelengths of the optical signals inputted into the optical channel monitors 75 and 83 are displaced, and whether the cause of the displacement of the wavelengths is due to the optical channel monitors 75 and/or 83.

For example, if the wavelength monitor value of the channel n is λn and the wavelength monitor value of the channel m is λm in the optical channel monitor (A) 83 and optical channel monitor (B) 75, the monitor controller 76 can determine that both the optical channel monitors 75 and 83 are operating normally. If the wavelength monitor value of channel n is λn1 and the wavelength monitor value of channel m is λm1 in the optical channel monitor (B) 75, the monitor controller 76 can determine that a defect or damage has occurred in the optical channel monitor (B) 75. If the wavelength monitor value of channel n is λn2 and the wavelength monitor value of channel m is λm2 in the optical channel monitor (A) 83, the monitor controller 76 can determine that a defect or damage has occurred in the optical channel monitor (A) 83.

(Embodiment 7)

Figure 19:
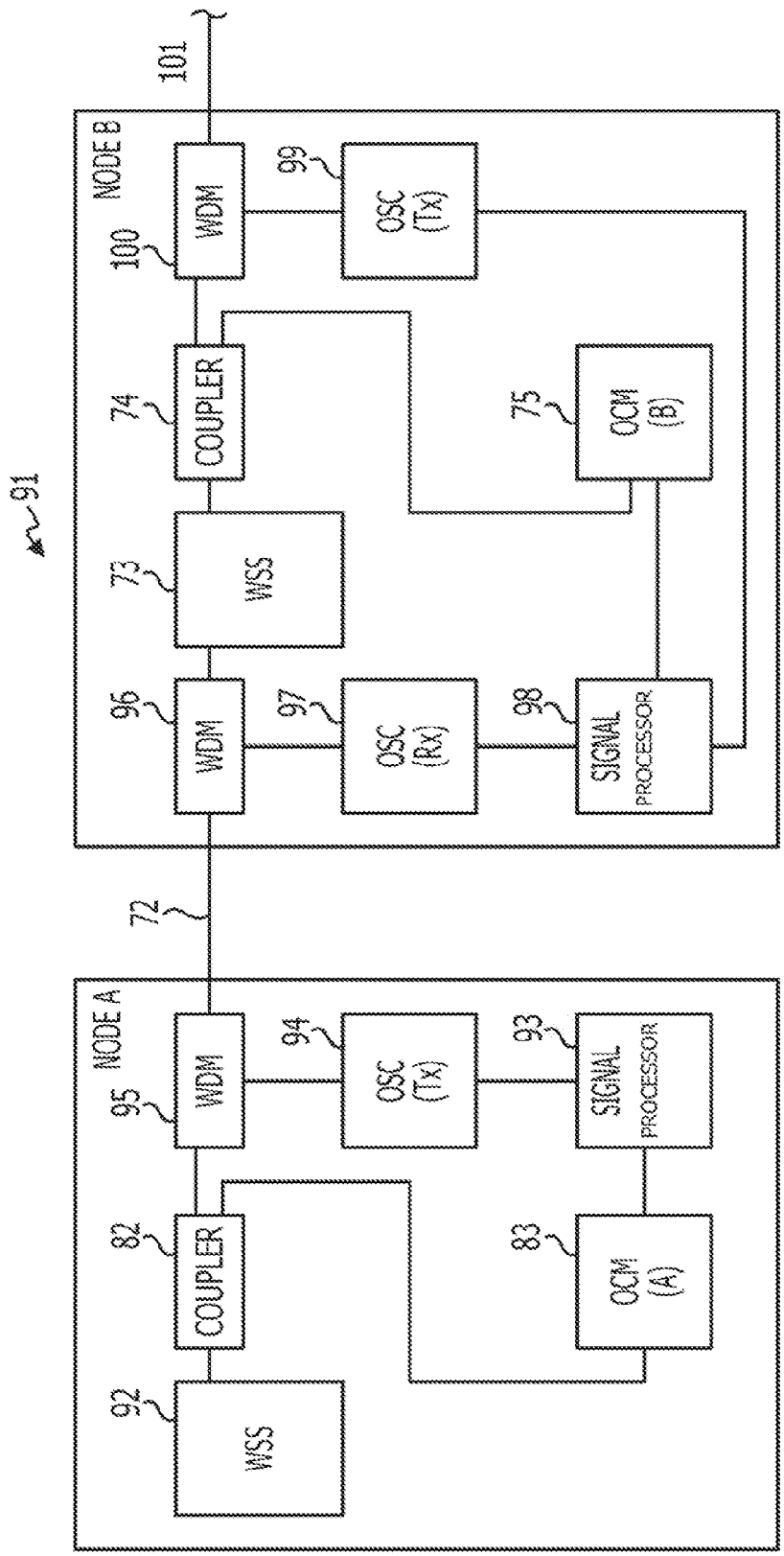
FIG. 19 is a block diagram of an optical transmission system according to a seventh embodiment.

A seventh embodiment is an example of another optical transmission system including an optical channel monitor. FIG. 19 is a block diagram of an optical transmission system according to the seventh embodiment. As illustrated in FIG. 19, an optical transmission system 91 of the seventh embodiment compares wavelength monitor values of wavelengths outputted from the optical channel monitor (A) 83 in an upstream node A with wavelength monitor values of wavelengths outputted from the optical channel monitor (B) 75 in a downstream node B, and then detects defect or damage to the optical channel monitors 75 or 83 in the same way as in the sixth embodiment.

The optical channel monitor (A) 83 in the node A outputs wavelength monitor values of wavelengths of optical signals outputted by a wavelength selectable switch 92 and branched by a coupler 82. A signal processor 93 generates monitoring control signals (OSC: Optical Supervisor Channel) including the wavelength monitor values of the wavelengths which are outputted from a monitoring control signal transmitter (OSC (Tx)) 94. A wavelength division multiplexer 95 multiplexes optical signals passing through the coupler 82 and the monitoring control signals and outputs the optical signals and the monitoring control signals to an optical path 72.

A wavelength division multiplexer 96 in the node B splits the optical signals inputted from the optical path 72 into monitoring control signals and data signals. A signal processor 98 extracts wavelength monitor values of wavelengths from the monitoring control signals received by a monitoring control signal receiver (OSC (Rx)) 97, and monitoring control signals to be transmitted to nodes further downstream. The data signals are inputted into the wavelength selectable switch 73. The optical channel monitor (B) 75 outputs the wavelength monitor values of the wavelengths of the optical signals outputted by the wavelength selectable switch 73 and branched by the coupler 74, to the signal processor 98.

The signal processor 98 compares the wavelength monitor values of the wavelengths sent from the node A, to wavelength monitor values of the wavelengths outputted from the optical channel monitor (B) 75 of the node B. In this way, the signal processor 98 can determine whether the wavelengths of the optical signals inputted into the optical channel monitors 75 and 83 are displaced, and whether the cause of the displacement of the wavelengths is due to the optical channel monitors 75 and/or 83.

Furthermore, the signal processor 98 generates monitoring control signals that include the wavelength monitor values of the wavelengths outputted from the optical channel monitor (B) 75, and outputs the monitoring control signals from a monitoring control signal transmitter 99. A wavelength division multiplexer 100 multiplexes optical signals passing through the coupler 74 and the monitoring control signals and outputs the optical signals and the monitoring control signals to an optical path 101.

(Embodiment 8)

Figure 20:
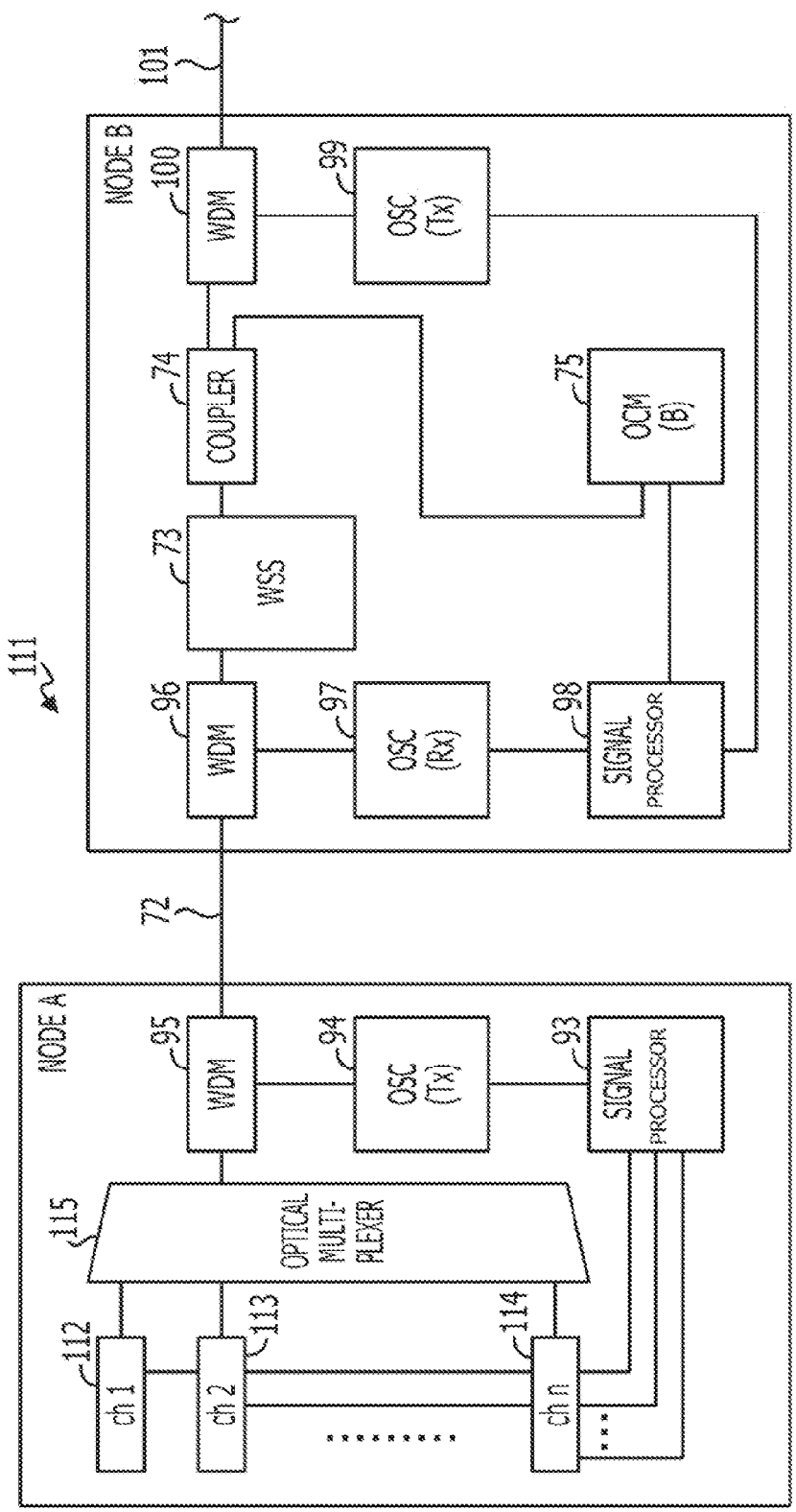
FIG. 20 is a block diagram of an optical transmission system according to an eighth embodiment.

An eighth embodiment is an example of another optical transmission system including an optical channel monitor. FIG. 20 is a block diagram of an optical transmission system according to an eighth embodiment.

As illustrated in FIG. 20, an optical transmission system 111 according to the eighth embodiment is an example of a device in which the node A in the optical transmission system according to the seventh embodiment is a device that transmits optical signals. In the eighth embodiment, a signal processor 93 in the node A obtains wavelength information from channel transmitters 112, 113, and 114, generates monitoring control signals containing the wavelength information, and outputs the monitoring control signals from a monitoring control signal transmitter 94. A wavelength division multiplexer 95 multiplexes and outputs the monitoring control signals and optical signals outputted from the channel transmitters 112, 113, and 114 and multiplexed by an optical multiplexer 115, to an optical path 72. The node B has the same configuration as the node B in the seventh embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. An optical transmission device comprising:
an extractor that extracts respective optical signals from optical signals multiplexed with a plurality of optical signals of different wavelengths;
a detector that detects wavelengths of the extracted respective optical signals;
a storage that stores the wavelengths of the detected respective optical signals; and
a processor that is configured to compare a currently detected wavelength of an optical signal from among the extracted optical signals with detected wavelengths that have been previously stored in the storage for the respective optical signal, to determine a wavelength shift amount for each wavelength over a given time based on the comparing, and, when a wavelength shift amount for two or more of the wavelengths are the same, to determine that one or both of the extractor and the detector cause the wavelength shifts.

2. The optical transmission device according to claim 1, wherein, when a wavelength shift amount for two or more wavelengths are the same and a wavelength has a wavelength shift amount that is different from the wavelength shift amount of the two or more wavelengths, the processor determines that one or both of the extractor and the detector cause the wavelength shifts and that the wavelengths were shifted before multiplexing.

3. The optical transmission device according to claim 1, wherein
the processor is configured to correct a wavelength value of the detected respective optical signals, based on the amount of wavelength shift.

4. The optical transmission device according to claim 1, wherein
the processor is configured to correct a threshold of an alarm to be sounded when the wavelengths of the optical signals are shifted before being multiplexed, based on the amount of wavelength shift.

5. The optical transmission device according to claim 1, wherein
the storage stores a relationship between an amount of wavelength shift and a parameter that controls one or both of the extractor and the detector; and wherein the processor is configured to correct the parameter based on the amount of wavelength shift and on the relationship between the amount of wavelength shift and the parameter.

6. An optical transmission system comprising:
a first optical transmission device that extracts first respective optical signals from optical signals multiplexed from a plurality of optical signals of different wavelengths, and detects first wavelengths of the extracted respective optical signals;
a second optical transmission device that extracts second respective optical signals from optical signals multiplexed from a plurality of optical signals of different wavelengths, and detects second wavelengths of the extracted respective optical signals; and
a processor that is configured to first compare a currently detected wavelength of an optical signal from among the extracted first optical signals with detected wavelengths that have been previously stored in a storage for the respective first optical signals, and to determine a wavelength shift amount for each wavelength of the different wavelengths over a given time based on the first comparing, and configured to second compare a currently detected wavelength of an optical signal from among the extracted second optical signals with detected wavelengths that have been previously stored in a storage for the respective second optical signals, and to determine a wavelength shift amount for each wavelength of the different wavelengths over a given time based on the second comparing; wherein
the processor is configured to determine that a shift in the first wavelengths is caused by the first optical transmission device when a wavelength shift amount for two or more of the first wavelengths are the same, and determines that
a shift in the second wavelengths is caused by the second optical transmission device when a wavelength shift amount for two or more of the second wavelengths are the same.

7. The optical transmission system according to claim 6, wherein
a first node having the first optical transmission device and a second node having the processor and the second optical transmission device are optically connected by optical fiber; and
wavelength information of the first respective optical signals includes control signals to be sent from the first node to the second node, and is transmitted through the optical fiber to the second node.

8. The optical transmission device according to claim 1, wherein the extractor is a wavelength division demultiplexer.

9. The optical transmission device according to claim 8, wherein the wavelength division demultiplexer is a grating or an arrayed waveguide diffraction lattice.

10. An optical transmission method comprising:
extracting respective optical signals with an extractor that extracts respective optical signals from optical signals multiplexed from a plurality of optical signals of different wavelengths;
detecting wavelengths of the respective optical signals with a detector that detects wavelengths of the extracted respective optical signals;
storing the wavelengths of the detected respective optical signals; and
comparing a currently detected wavelength of an optical signal from among the extracted optical signals with detected wavelengths that have been previously stored for the respective optical signal, to determine a wavelength shift amount for each wavelength over a given time based on the comparing, and, when a wavelength shift amount for two or more of the wavelengths are the same, determining that one or both of the extractor and the detector cause the wavelength shifts.

11. The optical transmission method according to claim 10, further comprising:

determining that wavelengths are shifted due to one or both of the extractor and the detector and that the wavelengths were shifted with one or more optical signals before multiplexing, when a wavelength shift amount for two or more wavelengths are the same among and at least one wavelength has a wavelength shift amount that is different from the wavelength shift amount of the two or more wavelengths.

* * * * *